United States Patent [19]  
Whitt

[11] 4,008,787  
[45] Feb. 22, 1977

[54] LUBRICATION SYSTEM
[75] Inventor: James A. Whitt, Fort Wayne, Ind.
[73] Assignee: General Electric Company, Fort Wayne, Ind.
[22] Filed: Jan. 24, 1975
[21] Appl. No.: 543,835

Related U.S. Application Data
[60] Division of Ser. No. 407,636, Oct. 18, 1973, Pat. No. 3,907,690, which is a continuation-in-part of Ser. Nos. 292,550, Sept. 27, 1972, abandoned, and Ser. No. 292,664, Sept. 27, 1972, abandoned.
[52] U.S. Cl. .................................. 184/12; 252/14; 252/28; 308/132; 264/466
[51] Int. Cl.² ................................... F16N 13/22
[58] Field of Search ............... 184/12, 5, 1 D, 6.23, 184/16, 102; 264/46.6; 308/132; 252/14, 13, 28

[56] References Cited  
UNITED STATES PATENTS

| | | | |
|---|---|---|---|
| 2,303,068 | 11/1942 | Schoenbaum | 252/28 |
| 2,427,636 | 9/1947 | Vaughan et al. | 252/13 |
| 2,900,338 | 8/1959 | Postelnek | 252/13 |
| 2,960,371 | 11/1960 | Staak | 308/132 |
| 2,966,459 | 12/1960 | Abel | 252/14 |
| 2,979,779 | 4/1961 | Staak | 264/46.6 |
| 3,113,105 | 12/1963 | Slayter et al. | 252/13 |
| 3,184,272 | 5/1965 | Ridgway | 308/132 |
| 3,214,375 | 10/1965 | Berkeley | 252/14 |
| 3,434,765 | 3/1969 | Abel | 308/132 |
| 3,466,244 | 9/1969 | Abel | 252/14 |
| 3,657,125 | 4/1972 | Strickman | 210/40 |
| 3,812,031 | 5/1974 | McCoy et al. | 210/30 |

Primary Examiner—Richard C. Pinkham  
Assistant Examiner—William R. Browne  
Attorney, Agent, or Firm—Joseph E. Papin

[57] ABSTRACT

In a lubrication system for an apparatus having a bearing assembly in a lubricant cavity therefor, there is provided means in the lubricant cavity for storing a liquid lubricant and for releasing it to effect a supply thereof to the bearing assembly. The storing and releasing means is generally constituted by a mixture of the liquid lubricant, a particulate mass of synthetic fibers, and a particulate mass of discrete, non-fibrous, multi-digited, resilient-type foam particles and wherein the foam particles of the particulate mass thereof are generally saturated with the liquid lubricant.

23 Claims, 11 Drawing Figures

LUBRICATION SYSTEM

CROSS-REFERENCE TO RELATED APPLICATIONS

This application is a division of my copending application Ser. No. 407,636, now U.S. Pat. No. 3,907,690, filed Oct. 18, 1973 which is a continuation-in-part of my then copending applications Ser. Nos. 292,550, 292,664 each filed Sept. 27, 1972, (now abandoned) and these copending applications, as well as my copending application Ser. No. 407,635 filed Oct. 18, 1973, now U.S. Pat. No. 3,984,956, are specifically incorporated by reference herein.

FIELD OF THE INVENTION

This invention relates generally to lubrication systems for apparatus and in particular to a lubrication system utilizing, as a means for storing and releasing a liquid lubricant, a mixture of the liquid lubricant, a particulate mass of synthetic fibers, and a particulate mass of resilient-type foam particles generally saturated with the liquid lubricant.

BACKGROUND OF THE INVENTION

In the past, lubrication systems utilizing various lubricant storage and releasing materials were well known in the art and commercially acceptable for use in lubricating various apparatus, such as electric motors for instance. The past known lubrication systems utilized commercially available lubricant storage and releasing materials which were composed of various fibrous materials, such as cellulose and synthetic fibers, including wood fibers, cotton fibers, nylon fibers, rayon fibers, glass fibers and the like. One form of past lubricant storing and releasing material, such as an oil impregnated, fibrous wicking material, is commercially available for a lubrication system under the trademark "PERMAWICK" from the Permawick Company of Detroit, Mich. U.S. Pat. No. 2,966,459, issued Dec. 27, 1960 to M. L. Abel for "Material Having Oil Retaining Properties" describes for a lubrication system a lubricant composition composed of cellulose fibers and a lubricating oil. The cellulose fibers which form the oil absorbing part of the wicking material are made from wood fibers and a mixture of paper containing fibers of wood, cotton and the like. U.S. Pat. No. 3,214,375 issued Oct. 26, 1965 to B. Berkeley for "Lubricating Wicking Material" discloses for a lubrication system an oil impregnated storing and releasing material composed of a blend of cellulose and synthetic fibers, such as nylon or rayon fibers. The cellulose fibers are described as being coated at least in part with a coating material of polyvinyl alcohol. U.S. Pat. No. 3,466,244 issued Sept. 9, 1969 to M. L. Able for "Oil-Impregnated Wicking Material" describes for a lubrication system a lubricating oil impregnated storage and releasing material formed of cotton linter fibers. Each of the above three patents is assigned to the Permawick Company, and these patents describe for a lubrication system commercially available Permawick extrudable lubricant storage and releasing material which in each instance has a distinctly fibrous structure. It is believed that at least one of the disadvantageous or undesirable features of these past lubrication systems was that they had a capacity to release only a relatively small or minor portion of the liquid lubricant contained therein.

U.S. Pat. No. 2,960,371 issued Nov. 15, 1960 to L. E. Staak for "Bearing Lubricating Structure" and U.S. Pat. No. 2,979,779 issued Apr. 18, 1961 to L. E. Staak for "Improved Method of Providing a Bearing Lubricating Structure" both describe a lubrication system which comprises an oil impregnated lubrication structure formed by foaming an epoxy or phenolic material in place directly in a bearing housing thereby to form a unitary cellular foam structure in the bearing housing. After the foam is formed in place in the bearing housing, the foam is impregnated with an appropriate lubricating oil.

The use of fibers of glass, asbestos, and the like as fillers for lubricating compounds of a lubrication system is also known in the art. U.S. Pat. No. 2,303,068 issued Nov. 24, 1942 to G. H. Schoembaum for "Lubricant and Preparation Thereof" describes the use of asbestos fibers as a filler to form a viscous lubricating composition. U.S. Pat. No. 3,133,105 issued Dec. 3, 1963 to G. Slayter et al. describes a lubrication system which comprises a silicone fluid lubricant incorporating short lengths of fibrous glass for use at high temperatures.

Various past lubrication systems for bearing structures of apparatus have employed felt feeder wicks. See, for example, U.S. Pat. No. 3,434,765 issued Mar. 25, 1969 to M. L. Abel for "Lubricating Bearing Assembly and Method of Making Same" and U.S. Pat. No. 3,184,272 issued May 18, 1965 to A. J. Ridgway for "Lubricating Means for a Rotatable Device." In this type of lubrication system, it is desirable that the lubricant impregnated or lubricant storing and releasing material release the lubricating oil which it contains at a rate and in an amount sufficient to maintain a steady flow of lubricant through the felt wick to the rotating structure to be lubricated. It is believed that significant problem confronting the art with respect to the past lubrication systems resided in the disadvantageous or undesirable feature that many of the lubricant compositions or extrudable lubricant storing and releasing materials heretofore known, while capable of being extruded or otherwise packed into the bearing structure, were capable of releasing only a relatively small portion of the total amount of lubricating oil contained therein. The smaller the releasable proportion of the liquid lubricant or oil, the shorter the life of the lubrication system, and hence, of the bearing structure itself. Furthermore, the unreleased portion of the lubricant obviously was not available to perform the intended lubricating function.

SUMMARY OF THE INVENTION

Among the several objects of the present invention may be noted the provision of a lubrication system for an apparatus having a bearing assembly with such lubrication system including means for storing a liquid lubricant and for releasing it to effect a supply thereof to the bearing assembly which overcomes the disadvantageous or undesirable features of the past lubrication systems discussed hereinabove, as well as others; the provisions of such lubrication system in which the storing and releasing means is a mixture of a liquid lubricant, a particulate mass of synthetic fibers, and a particulate mass of resilient-type foam particles wherein the foam particles of the particulate mass thereof are generally saturated with the liquid lubricant; the provision of such lubrication system which has the capacity of releasing at least a major portion of the liquid lubricant stored therein; the provision of such lubrication system having liquid lubricant release and transmission characteristics similar to those utilizing a conventional wool storage wicking material; the provision of such lubrication system having improved moisture resistance and which is resistant to leaking of the liquid lubricant thereof when subjected to a wet, moist or humid environment; and the provision of such lubrication system which exhibits a long and useful life in either dry or humid atmospheres with minimum re-lubricating or re-oiling requirements. Other objects and advantageous features of the present invention will be in part apparent and in part pointed out hereinafter.

In general, a lubrication system in one form of the invention is provided for an apparatus, the apparatus having a bearing assembly in a lubricant cavity therefor. In this lubrication system, means is provided in the lubricant cavity for storing a liquid lubricant and for releasing it to effect a supply thereof to the bearing assembly. The storing and releasing means is generally constituted by a mixture of the liquid lubricant, a particulate mass of synthetic fibers, and a particulate mass of discrete non-fibrous, multi-digited, resilient-type foam particles and wherein the particulate mass of the foam particles is generally saturated with the liquid lubricant.

Also in general, a lubrication system in one form of the invention is provided for an apparatus; the apparatus having a lubricant cavity with a bearing assembly disposed therein and also having means for feeding a liquid lubricant supplied thereto to the bearing assembly and disposed in the cavity in association with the bearing assembly. In this lubrication system, means is also disposed within the lubricant cavity in interfacing relation with the feeding means for storing the liquid lubricant and for releasing it to effect the supply thereof to the feeding means. The storing and releasing means is generally constituted by a mixture of the liquid lubricant, a particulate mass of synthetic fibers, and a particulate mass of discrete non-fibrous, multi-digited, resilient-type foam particles and wherein the particulate mass of the foam particles is generally saturated with the liquid lubricant.

Further in general, a lubrication system in one form of the invention is provided for an apparatus: the apparatus having a lubricant cavity with a bearing assembly disposed herein adapted to journal a movable component of the apparatus; and means for feeding a liquid lubricant supplied thereto to the bearing assembly and the movable component for lubricating it with the feeding means being disposed in the cavity in lubricating association with the bearing assembly and the movable component. In the lubricant system, means adapted to be extruded into the cavity into interfacing relation with the feeding means is provided for storing the liquid lubricant and releasing it to effect the supply thereof to the feeding means. The storing and releasing means is generally constituted by a mixture of the liquid lubricant, a particulate mass of synthetic fibers, and a particulate mass of discrete, non-fibrous, multi-digited, resilient type polymer foam particles with the liquid lubricant generally saturating the polymer foam particles of the particulate mass thereof and the polymer foam particles having a capacity of releasing at least a major portion of the liquid lubricant stored therein to supply it to the feeding means. A major portion of the polymer foam particles of the particulate mass thereof has a range size generally between about 20-mesh and about 80-mesh with the polymer foam particles of the particulate mass thereof having sizes between about 5-mesh and about 200-mesh exclusively of the major portion range size. The synthetic fibers of the particulate mass thereof have an average diameter of between about 0.75 microns and about 5.5 microns and an average length of between approximately 0.005 inches and approximately 0.015 inches.

BRIEF DESCRIPTION OF THE DRAWINGS

Corresponding reference characters indicate corresponding parts throughout the several views of the drawing.

The exemplifications set out herein illustrate the preferred embodiments of the invention, and such exemplifications are not to be construed as limiting in any manner.

DETAILED DESCRIPTION OF THE PREFERRED EMBODIMENT

Figures 1, 2:
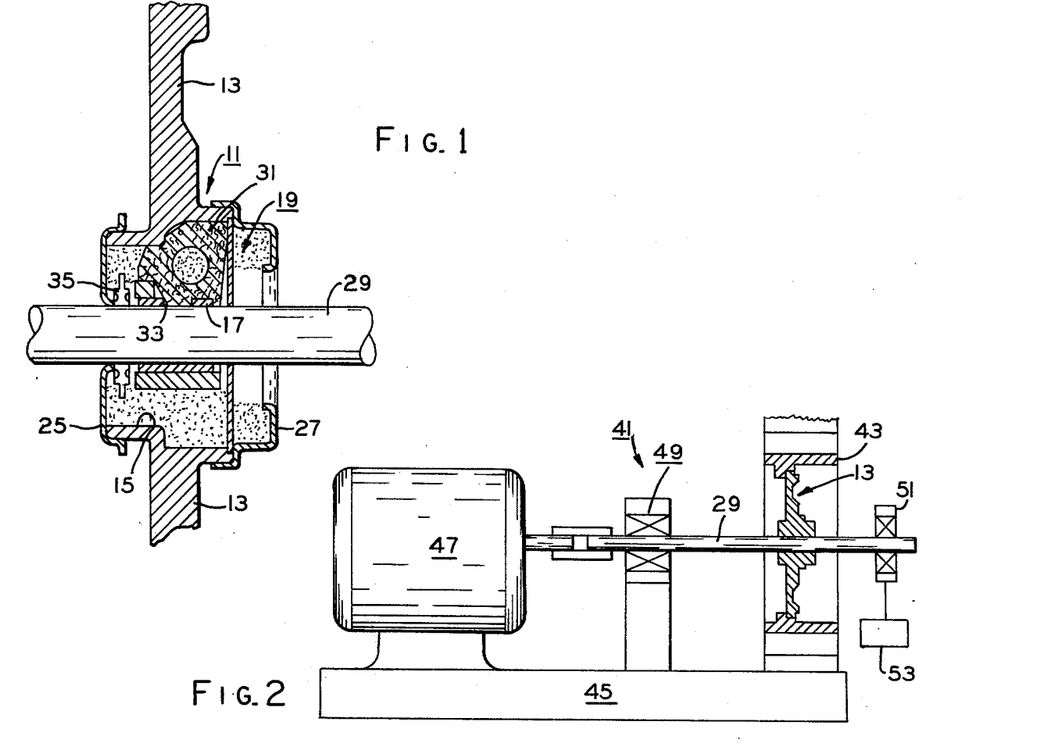
FIG. 1 is a sectional view of a bearing cavity of an apparatus in which a lubrication system in one form of the invention is illustrated.
FIG. 2 is a diagrammatic representation of a reaction type dynamometer testing apparatus.
Figure 1A:
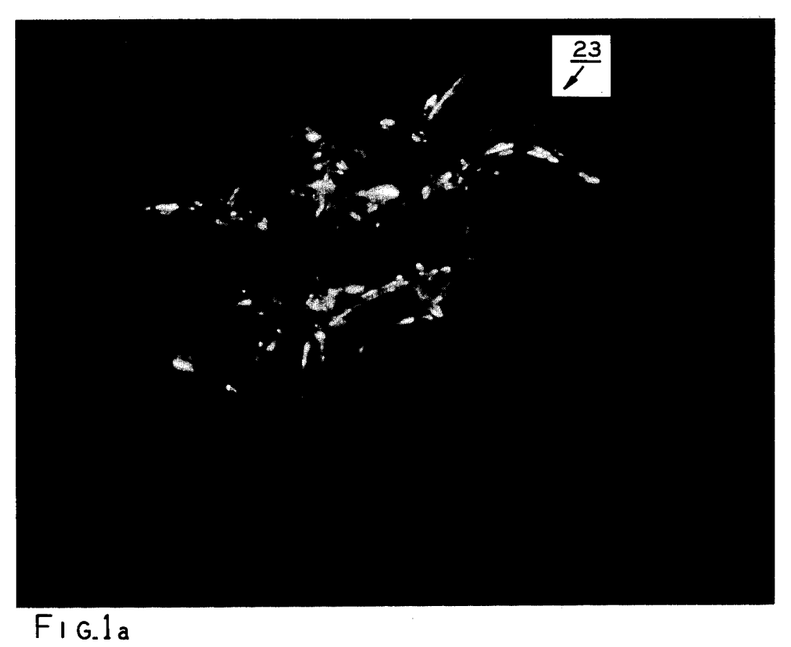
FIG. 1A is a photomicrograph, 40× magnification, of a polymer foam particle of the lubrication system having a size between about 20-mesh and about 35 mesh.
Figure 1B:
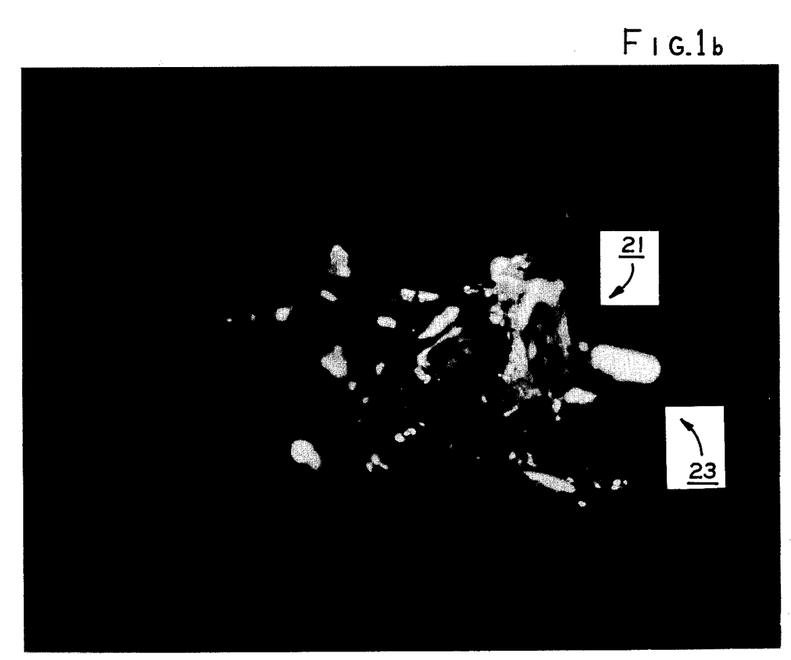
FIG. 1B is a photomicrograph of 40× magnification of a polymer foam particle similar to that shown in FIG. 1A mixed with a liquid lubricant for the lubrication system.

Referring now to the drawings in general, there is illustrated at 11 a lubrication system in one form of the invention (FIG. 1) Lubrication system 11 is provided for an apparatus 13 having a lubricant or bearing cavity 15 with a bearing assembly 17 therein. Means, such as a lubricant composition indicated generally at 19, is disposed in lubricant cavity 15 for storing a liquid lubricant 21 (FIG. 1B) and for releasing it to effect a supply thereof for bearing assembly 17 (FIG. 1). Storing and releasing means or lubricant composition 19 is generally constituted by a mixture of liquid lubricant 21, a particulate mass of synthetic fibers, and a particulate mass of discrete, non-fibrous, multi-digited, resilient-type foam particles 23 (FIG. 1A) and wherein foam particles of the particulate mass thereof are generally saturated with the liquid lubricant (FIG. 1B).

More particularly and with specific reference to FIG. 1, apparatus 13 is shown for purposes of disclosure as a General Electric 39-Frame end shield for a dynamoelectric machine (not shown); however, it is contemplated that lubrication system 11 of this invention may be utilized in any suitable or adaptable apparatus having components requiring lubrication within the scope of this invention. End shield 13 together with an end cap 25 and an oil well or lubricant cavity cover 27 respectively attached thereto generally define lubricant cavity 15, and bearing assembly 17 is disposed or mounted in the lubricant cavity in a manner well known to the art. For purposes of disclosure, bearing assembly 17 is illustrated as a tin-babbet metal sleeve bearing or the like, but it is contemplated that other bearing assemblies well known in the art may be employed in end shield 13 within the scope of the invention. A rotatable member or movable component, such as a shaft 29 of the dynamoelectric machine (not shown), is rotatably supported in end shield 13 and journaled in bearing assembly 17, and the shaft may also extend through end cap 25 and oil well cover 27. Means, such as a felt feeder wick 31, for feeding liquid lubricant 21 supplied thereto to bearing assembly 17 is conveniently mounted in lubricant cavity 15 and extends through a receiving aperture or opening 33 therefor in bearing assembly 17 into rubbing or lubricating engagement with a peripheral or journaled surface of shaft 29. It may be noted that lubricant composition 19 in lubricant cavity 15 is disposed in interfacing or lubricant transmitting or supplying engagement with feeding means or feeder wick 31; therefore, the lubricant composition may release liquid lubricant 21 stored therein to transmit a supply thereof to the feeder wick which, in turn, applies the liquid lubricant onto shaft 29 for lubricating it and bearing assembly 17. Means, such as an oil slinger or thrower 35 is mounted to shaft 29 for returning or slinging any liquid lubricant 21, which may flow from feeder wick 31 between bearing assembly 17 and the shaft, back into storage in lubricant composition 19.

Lubricant composition 19 is adapted to be extruded into lubricant cavity 15 by the use of commercially available extruding apparatus, as well known in the art, and it is also contemplated that the lubricant composition may be packed by hand or otherwise suitably placed in the lubricant cavity within the scope of the invention. When so placed in lubricant cavity 15, thereby to complete lubrication system 11 for apparatus 13, lubricant composition 19 is disposed in interfacing and lubricant transferring or supplying relation with feeder wick 31. In this manner, foam particles 23 of lubricant composition 19 may release liquid lubricant 21 contained thereby to effect a supply or flow of the liquid lubricant directly to feeder wick 31 which, in turn, supplies it to shaft 29 for lubrication purposes. As previously mentioned, any liquid lubricant 21 flowing from bearing assembly 17 generally along the peripheral surface of shaft 29 is thrown or displaced therefrom by slinger 35 back into storage in lubricant composition 19 of lubrication system 11.

Foam particles 23, which form a portion of lubricant composition 19, are described in detail in my copending application Ser. No. 407,635 filed Oct. 18, 1973 which, as previously noted, is specifically incorporated herein by reference. For a more comprehensive discussion of polymeric foam particles per se, their use with a liquid lubricant, and the method of forming the foam particles, reference may be had to my aforementioned copending application Ser. No. 407,635.

A preferred embodiment of the invention, as illustrated by lubrication system 11, is to utilize lubricant composition 19 in interfacing relation with feeder wick 31, as previously described hereinabove; however, in some lubricating systems, it is contemplated that the lubricant composition may be in direct lubricant transferring relation on engagement with an apparatus component to be lubricated within the scope of the invention. As mentioned above, lubrication system 11 is not intended to be limited to any particular structural feature of the apparatus in which the lubrication system may be employed, and with regard to such different apparatus constructions, reference may be had, for example, to those shown in U.S. Pat. Nos. 2,966,459, 3,434,765, 3,184,272 and 2,960,371 referred to above.

Lubricant composition 19 for lubrication system 11 may be formed by initially mixing liquid lubricant 21 with the particulate mass of synthetic fibers and then admixing thereto the particulate mass of discrete, non-fibrous, multi-digited, resilient foam particles 23. Although the particular order of mixing stated above is preferred, it is contemplated that other orders of mixing liquid lubricant 21, the synthetic fibers and foam particles 23 may also be effective. Further, it is conventional practice in the art to select a liquid lubricant or lubricating oil in accordance with the characteristics of the bearing means to be lubricated with reference to the particular configuration and bearing material thereof and in accordance with the conditions under which the apparatus housing such bearing means will be operated keeping in mind the particular environment to which such apparatus will be exposed.

More particularly, in lubrication system 11, the form of glass fibers mixed with liquid lubricant 21 have extremely small diameters and are sometimes referred to as "microfibers" or as "Microfiberglass". The microfibers of glass have, in general, an average fiber diameter of between about 0.75 and about 5.5 microns (about 0.00003–0.00022 inches), and the fibers may be formed of an appropriate glass such as borosilicate glass, or of quartz (silicon dioxide). One form of microfibers of glass, known as "108 type E", is obtainable from the Johns-Manville Co. and consists of very fine fibers of borosilicate glass having an average fiber diameter of 0.76 to 1.5 microns, and another type, also obtainable from Johns-Manville Co., is "110 type 475" consisting of fine fibers of borosilicate glass having an average diameter of 1.52 to 2.54 microns. Because microfibers of glass are conventionally supplied in a form in which the glass is in long strands or hairs, the material is preferably reduced in length, by chopping or comminuting or the like, prior to use to an average length in the range of about 125 to about 380 microns (0.005 to 0.015 inches). While microfibers of glass and microfibers of quartz, as discussed hereinafter, as disclosed as synthetic fibers of lubricant composition 19, it is believed that other synthetic microfibers having average diameters within the range mentioned above, i.e. between approximately 0.75 and 5.5 microns, may also employed within the scope of the invention.

Polymeric foam particles 23 are formed, as more particularly described in my copending application Ser. No. 407,635 filed Oct. 18, 1973 by first producing a polymer foam material, such as polyurethane foam, having a resilient cellular structure. The foamed resilient polymer is then reduced, such as by comminuting or the like, to a particle size between about 5-mesh and about 200-mesh, and more particularly, to a particle size such that a major portion in the range of about 65 to about 85% of the particles pass a 20-mesh screen and about 2 to about 10% passes an 80-mesh screen. Polymeric foam particles 23 are produced by fracturing or rupturing the cellular structure, i.e., fracturing or rupturing both the cell ribs and the cell walls of the foamed polymer material, thereby to produce highly irregular, branched or multi-digited particles. Among the polymeric materials which have been found to be useful in connection with the present invention are the widely known resilient polyurethane foams, particularly polyurethane foams of the ether and ester types. These foams are well known in the art and are widely available from a variety of commercial sources under the general designation of polyurethane foam. The principal characteristic of the polymeric foam, such as a polyurethane foam from which foam particles 23 are formed, is that the foam be characterized as resilient or as a resilient type as distinguished from rigid when in the block or particulate form. As used herein, these terms distinguish between those resilient foam materials which give or yield to touch and, when squeezed by hand, revert to substantially their original configuration, and the relatively rigid foam materials which crush or fracture when squeezed by hand and do not revert to their original configuration after squeezing. The desired resilient or spongy foam materials retain their characteristic resilient feel after comminution or reduction to the desired particulate size, whereas the rigid foam materials retain a brittle, non-resilient characteristic after comminution or granulation.

Liquid lubricant or lubricating oil 21 may be of any selected type, depending principally upon the use, operating conditions and atmospheric conditions in which the lubricant is to be utilized. For example, for many fractional horse power motor applications, a lubricant such as is designated in U.S. Pat. No. 3,466,244 as a 280 oil may be utilized. The oil 21 selected is mixed with the microfibers of glass, and the particulate polymeric material, such as foam particles 23 produced by comminuting the polyurethane foam material, is admixed thereto. Generally speaking, the ratio of foam particles 5 to fiberglass in lubricant composition 1 would be between about 3 to 1 to about 5 to 1 weight, and the foam particles of the particulate mass thereof are substantially or generally saturated with liquid lubricant 21 with the glass fibers and foam particles 23 forming between about 10 to about 20% by weight and the liquid lubricant forming between about 80 and about 90% by weight of lubricant composition 19. More specifically, the microfibers of glass and polymer foam particles 23 form about 13 to about 17% by weight of lubricant composition 19, and lubricant oil 21 itself forms about 83 to about 87% by weight of the lubricant composition. Lubricant composition 19 may then be extruded or otherwise packed into lubricant cavity 15 of apparatus 13, as previously described.

The following examples more particularly illustrate lubricant composition for lubricating system 11. It should be understood that the examples are given by way of illustration and not by way of limitation:

EXAMPLE 1

Composition:
 10% by weight of microfibers of glass having an average fiber diameter within the range of 1.52 to 2.54 microns
 90% by weight type 280 bearing lubricating oil Preparation:
 The microfibers of glass in bulk were obtained from the Johns-Manville Company of New York City, as its fiber diameter size number 110, (fiber 100 Type 475) constituting an electrical insulation grade glass fiber, industry code AA. The fibers were chopped to a length of 0.005 to 0.015 inches and were thoroughly mixed with the bearing lubricating oil

EXAMPLE 2

Composition:
 10% by weight of microfibers of quartz having an average fiber diameter within the range of 0.76 to 1.52 microns
 90% by weight type 280 bearing lubricating oil.

Preparation:
 The microfibers of quartz in bulk form were obtained from the Johns-Manville Company, as its fiber diameter size number 108, constituting an electrical insulation grade quartz fiber, industry code AA. The fibers were chopped to a length of 0.005 to 0.015 inches and then thoroughly mixed with the bearing lubricating oil.

EXAMPLE 3

Composition:
 5% by weight of microfibers of glass having an average fiber diameter within the range of 0.76 to 1.52 microns
 5% by weight of microfibers of glass having an average fiber diameter within the range of 1.52 to 2.54 microns
 90% by weight type 280 bearing lubricating oil Preparation:
 Bearing lubricating oil was poured into a container housing equal parts by weight of Johns-Manville microfibers of glass of diameter sizes 108 and 110 (fibers 108 Type E and 110 Type 475) chopped into short lengths as described above. The oil impregnated glass microfibers were then thoroughly mixed until a substantially homogeneous blend of the oil and fibers was obtained.

EXAMPLE 4

Composition:
 10% by weight of microfibers of glass having an average fiber diameter within the range of 0.76 to 1.52 microns
 90% by weight type 280 bearing lubricating oil Preparation:
 The microfibers of glass in bulk form were obtained from the Johns-Manville Company, as its fiber diameter size number 108 (fiber 108 Type E). The fibers were chopped to an average length of 0.005 to 0.015 inches, and thoroughly mixed with the bearing lubricating oil.

EXAMPLE 5

Composition:
 5% by weight of microfibers of glass having an average fiber diameter within the range of 0.76 to 1.52 microns
 95% by weight type 280 bearing lubricating oil Preparation:
 The microfibers of glass in bulk form were obtained from the Johns-Manville Company, as its fiber diameter size number 108 (108 Type E). The fibers were chopped and thoroughly mixed with bearing lubricating oil as described in Example 4. The weight ratio of 95% oil to 5% glass fibers was observed to substantially saturate the glass fibers.

Figure 4:
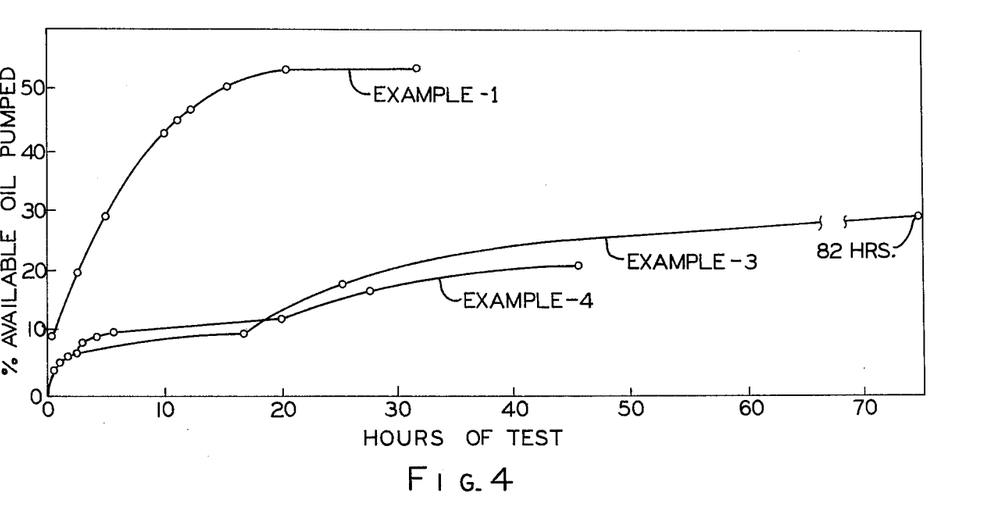
FIG. 4 is a graphic representation of the oil release characteristics of lubricant compositions prepared according to Examples 1, 3 and 4.

The lubricant impregnated wicking materials, prepared as described in Examples 1, 3 and 4, were then packed into a General Electric Company 39-Frame motor end shield 13, of the type shown in FIG. 1, but modified to prohibit oil from recirculating to the bearing cavity. Each end shield to be tested was mounted in a testing apparatus 41 of the type shown in FIG. 2, and a bearing load of 45 pounds was applied to shaft 29 outboard of bearing structure 17. The bearing temperature was maintained at 70° C. An on/off cycle of 4.75 minutes on and 0.25 minutes off was applied. The test results were plotted and are shown in solid lines in FIG. 4. With reference to FIG. 4, it may be seen that during the first few hours the wicking materials of Examples 1, 3 and 4 released oil at an excellent rate, that is at a rate sufficiently high to ensure proper bearing lubrication, while not so high as either to cause overflow of oil within the motor, or to overstress the oil reabsorption rate capacity of the wicking material.

The test apparatus 41 may be referred to as a dynamometer test apparatus and is illustrated diagrammatically in FIG. 2. In apparatus 41, a General Electric 39-Frame motor end shield 13 of the type shown in FIG. 1 is mounted in a cradle bearing 43 supported on a base 45 and attached to a torque measuring transducer (not shown). Shaft 29 driven by a motor 47 is supported adjacent one end by end shield 13 and bearing 17 and by a rear support bearing 49 intermediate cradle bearing 43 and drive motor 47. Shaft 29 extends through the test bearing 17 and is supported at its outer end by a load sustaining bearing 49 and from which a weight 36 is suspended. Feeder wick 31, as shown in FIG. 1, is positioned above shaft 29 so that weight 36, as shown in FIG. 2, is positioned 180° from the feeder wick. Weight 36 may, however, be positioned at any other angular relationship with respect to feeder wick 31, depending upon the particular test conditions.

Figure 3:
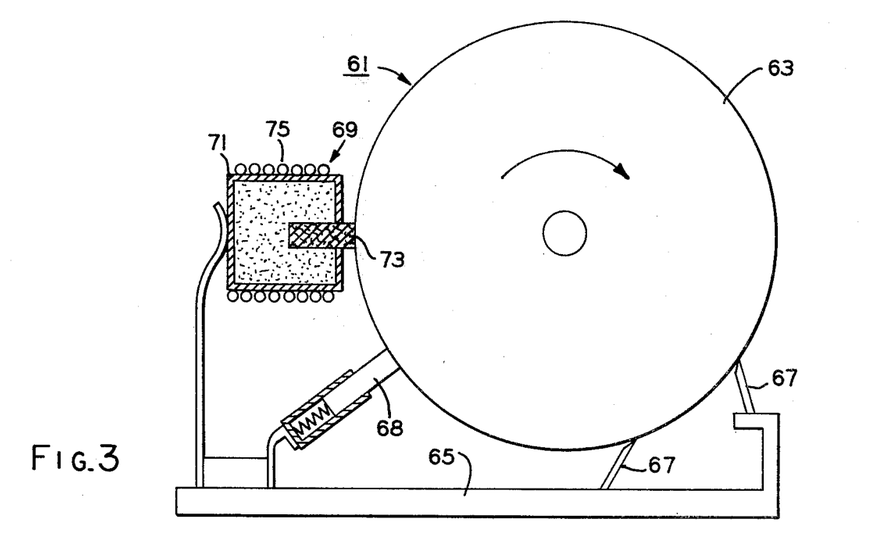
FIG. 3 is a diagrammatic representation of an oil release testing apparatus.
Figure 5:
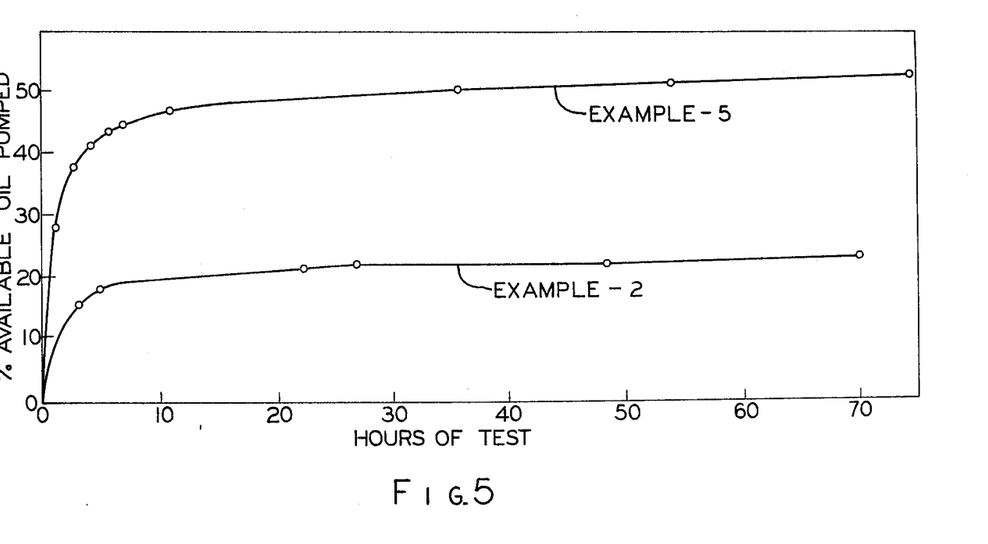
FIG. 5 is a graphic representation of the oil release characteristics of lubricant compositions prepared according to Examples 2 and 5.

The lubricating oil impregnated wicking materials prepared as described in Examples 2 and 5 were then tested in another test apparatus 61 simulating useage of the material when lubricating bearing 17 of a General Electric Company 39-Frame motor end shield 13. A schematic diagram of the testing apparatus utilized is shown in FIG. 3. Referring to FIG. 3, test apparatus or equipment 61 included as 5½ inch steel wheel 63 having a one inch wide peripheral rim. The wheel was rotatably mounted on a frame 65. A pair of oil scrapers 67 were mounted on frame 65 to remove oil picked up by the peripheral wheel 63. A felt wiper 67 was mounted on frame 65 and positioned against wheel 63 to remove any remaining oil left by scrapers 67. The test sample of lubricating oil impregnated wicking material was placed in a test unit indicated generally at 69. Test unit 69 included a container or tube 71 having a volume which approximated that of lubricant reservoir 15 in the 39-Frame motor end shield 13 of the type shown in FIG. 1. A felt feeder wick 73 extended through the end cap of container 71 to the surface of the wheel rim 63. The opposite end of container 71 was capped with an end cap perforated to permit air pressure within the containers to be equalized with ambient air pressure. Aluminum heater coils 75 were wrapped about the exterior of container 71, and a thermocouple (not shown) was attached to control the temperature of the sample. With the sample temperature maintained at 75° C., the wheel 63 was rotated at a speed which, in connection with the area of the feeder wick terminal surface, simulated a one-half inch shaft rotating at 1750 rpm in a 39-Frame motor end shield bearing 17. Oil loss versus time was determined by periodically weighing the sample container 71. The results of the tests with the composition of Examples 2 and 5 are shown in FIG. 5.

EXAMPLE 6

Composition:
3½% by weight 108 Type E microfibers of glass
10% by weight particulate ester type polyurethane
86½% by weight type 280 bearing lubricating oil Preparation:
The microfibers of glass (Johns-Manville 108 Type E) were chopped as described in Example 4 and thoroughly mixed with the type 280 bearing lubricating oil. Resilient, ester type polyurethane foam having 60ppi (pores per linear inch), obtained from Scott Paper Co., Eddystone, Pa. was reduced or otherwise comminuted into foam particles until substantially all the foam particles passed through a U.S. Standard Sieve Series size 5-mesh screen, and majority passed through a size 20-mesh screen. The resulting particulated polyurethane was then thoroughly admixed with the mixture of microfibers of glass and oil.

EXAMPLE 7

Composition:
2½% by weight 108 Type E microfibers of glass
12½% by weight particulate ester type polyurethane
85% by weight type 280 bearing lubricating oil Preparation:
The microfibers of glass were chopped and thoroughly mixed with the lubricating oil, as described in Example 6. Resilient 60 ppi ester type polyurethane foam, of the type referred to in Example 6, was reduced or otherwise comminuted into particles until about 60% to about 70% of the particles passed through a size 20-mesh screen. The resulting polyurethane foam particles were then thoroughly admixed with the mixture of microfibers of glass and oil.

EXAMPLE 8

Composition:
1½% by weight 108 Type E microfibers of glass
13½% by weight particulate ester type polyurethane
85% by weight type 280 bearing lubricating oil Preparation:
The microfibers of glass were chopped and thoroughly mixed with the bearing lubricating oil as described in Example 6. Resilient 75 ppi ester type polyurethane foam, from Scott Paper Co., was reduced or otherwise comminuted into foam particles until a majority of the foam particles passed through a size 8-mesh screen. These polyurethane foam particles were then thoroughly admixed with the mixture of microfibers of glass and oil.

EXAMPLE 9

Composition:
3% by weight microfibers of quartz
12% by weight particulate ester type polyurethane
85% by weight type 280 bearing lubricating oil Preparation:

The microfibers of quartz, of the type described in Example 2, were thoroughly mixed with the bearing lubricating oil. Resilient, 60 ppi, ester type polyurethane foam was reduced or otherwise comminuted into foam particles until a majority of the foam particles passed through a size 5-mesh screen. The resultant polyurethane foam particles were then thoroughly admixed with the mixture of microfibers of quartz and oil.

Figure 6:
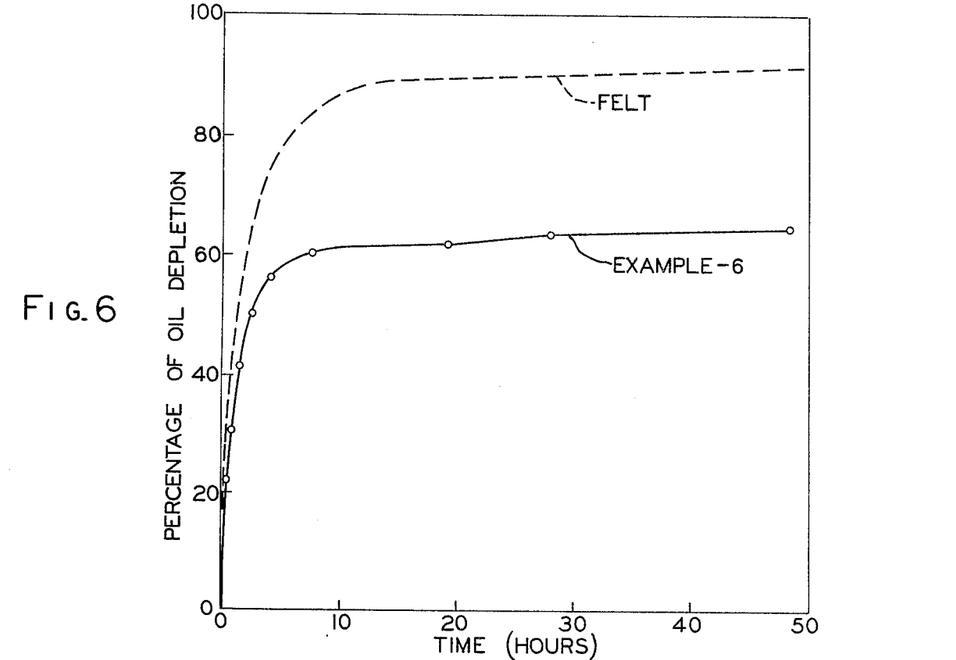
FIG. 6 is a graphic representation of the oil release characteristics of a lubricant composition of the lubrication system prepared according to Example 6.
Figure 7:
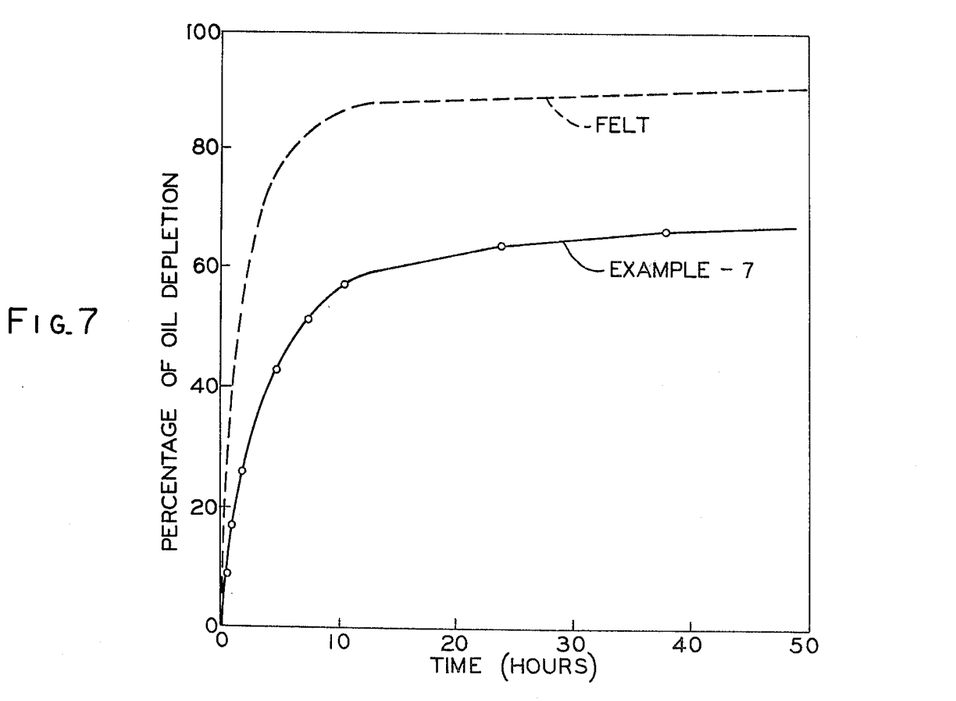
FIG. 7 is a graphic representation of the oil release characteristics of a lubricant composition of the lubrication system prepared according to Example 7.
Figure 8:
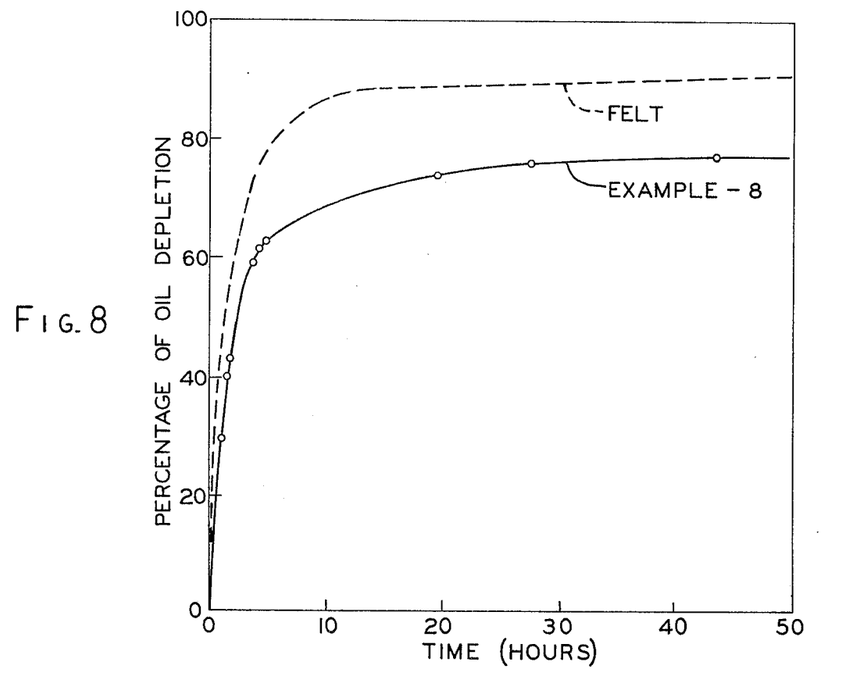
FIG. 8 is a graphic representation of the oil release characteristics of a lubricant composition of the lubrication system prepared according to Example 8.

The lubricant composition prepared as described in Examples 6, 7 and 8 was then packed into a General Electric Company 39-Frame motor end shield 13 of the type shown in FIG. 1, but modified to prohibit oil from recirculating to the bearing cavity. Modified end shield 13 to be tested was mounted in testing apparatus 41 of the type shown in FIG. 2, and a bearing load of 45 pounds was applied to shaft 29 outboard of bearing structure 17. The bearing temperature was maintained at 70° C. An on/off cycle of 4.75 minutes on and to 0.25 minutes off was applied. The test results for Examples 6, 7 and 8 were plotted and are shown in solid lines in FIGS. 6, 7 and 8. The results shown in FIGS. 6, 7 and 8 were compared to the oil release rate of the wool felt, as measured in a similar test utilizing a wool felt packing, as shown in dotted lines in FIGS. 6, 7 and 8. With reference to these figures, it may be seen that during the first few hours the oil impregnated wicking material of the invention released oil at an excellent rate, that is at a rate sufficiently high to ensure proper bearing lubrication, while not so high as either to cause overflow of oil within the motor, or to overstress the oil reabsorption rate capacity of the wicking material. The circled points along the curves indicate actual test measurements upon which the curves are based.

Figure 9:
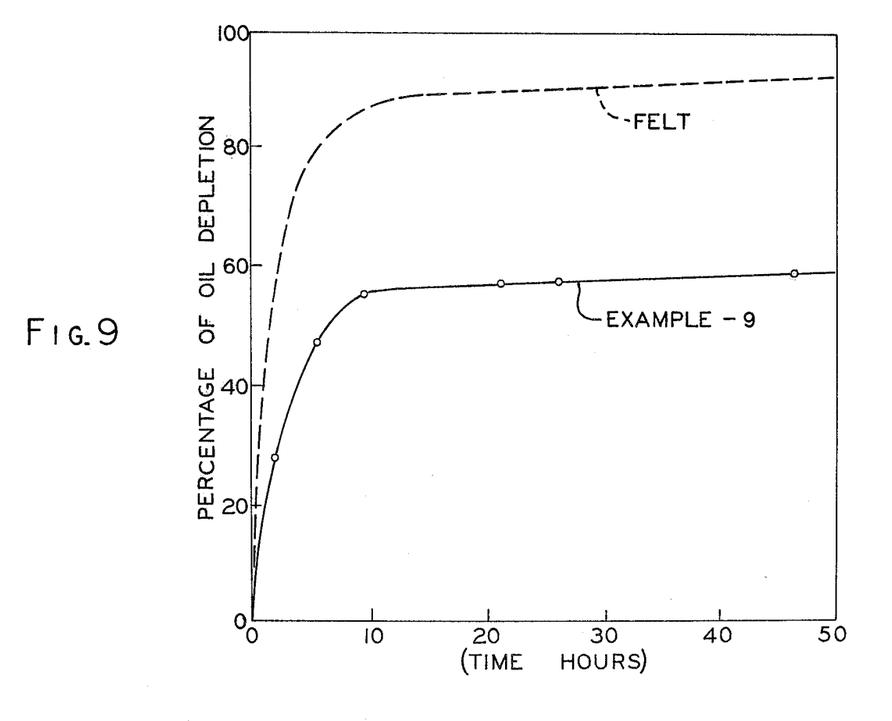
FIG. 9 is a graphic representation of the oil release characteristics of a lubricant composition of the lubrication system prepared according to Example 9.

The lubricating oil impregnated wicking medium prepared according to Example 9 as then tested in a test apparatus of the type shown in FIG. 3 and described above. Oil loss versus time was determined by periodically weighing the sample containing tube, and the results were plotted and are shown in the solid line in FIG. 9. It should be noted that the test on the wool felt, shown in FIGS. 6, 7, 8 and 9 was also obtained in apparatus 61 of the type shown in FIG. 3, utilizing wool felt as the lubricant containing packaging material.

Either microfibers of glass or microfibers of quartz mixed with liquid lubricant 21 may be admixed with particulate polyurethane polymeric foam particles 23 to form lubricant composition 19 which is suitable for packing by hand or by commercially available extruding equipment into bearing cavity 17 of apparatus 13 thereby to complete lubrication system 11 therefor.

As pointed out in copending application Ser. No. 407,635 filed Oct. 18, 1973, foam particles 23 should be resilient and also heat resistant to at least 105° C under continued use. Foam densities of about two pounds per cubic foot have been found to produce desirable results, where the foam meets the other characteristics required, particularly those of being multidigited and resilient.

Microfibers of glass are preferred over microfibers of quartz for reasons of economy, although both perform equally well. In general, it has been observed that the preferred range of average lengths of the microfibers of glass or quartz is between about 5 to about 15 mils.

By blending microfibers of glass or quartz with particulate polyurethane materials, it is possible to prepare lubricant compositions possessing the functional characteristics specifically desired for a particular application. In general, it has been observed that the larger the synthetic fiber content with respect to the polymer content, the greater will be the oil retention property of the lubricant composition. Conversely, the larger the foam content, the greater the oil release rate.

While certain illustrative forms and compositions for use in lubrication system 11 have been described above in considerable detail, it should be understood that there is no intention to limit the lubrication system to the specific forms and compositions disclosed.

From the foregoing, it is now apparent that a novel lubrication system 11 is provided meeting all of the objects and advantageous features set out hereinabove, as well as others, and that changes in the lubricant composition and the arrangements, shapes and details of the components of the apparatus may be made by those having ordinary skill in the art without departing from the spirit of the invention or the scope thereof, as set out by the claims which follow. What I claim as new and desire to secure by Letters Patent of the United States is:

1. In a lubrication system for an apparatus, the apparatus having a bearing assembly in a lubricant cavity therefor; said lubrication system comprising means in said lubricant cavity for storing a liquid lubricant and for releasing it to effect a supply thereof to said bearing assembly, said storing and releasing means comprising a mixture of said liquid lubricant, a particulate mass of synthetic fibers, and a particulate mass of discrete nonfibrous, multi-digited, resilient-type foam particles and wherein said foam particles of said particulate mass thereof are generally saturated with said liquid lubricant.

2. In a lubrication system for an apparatus, the apparatus having a lubricant cavity with a bearing assembly disposed therein and also having means for feeding a liquid lubricant supplied thereto to the bearing assembly with the feeding means disposed in the lubricant cavity in association with the bearing assembly; said lubrication system comprising means disposed within said lubricant cavity in interfacing relation with said feeding means for storing said liquid lubricant and for releasing it to effect the supply thereof to said feeding means, said storing and releasing means comprising a mixture of said liquid lubricant, a particulate mass of synthetic fibers, and a particulate mass of discrete nonfibrous, multi-digited, resilient-type foam particles and wherein said particulate mass of said foam particles is generally saturated with said liquid lubricant.

3. The lubrication system a set forth in claim 2 wherein said storing and releasing means has a capacity to release at least a major portion of said liquid lubricant stored therein to supply it to said feeding means.

4. The lubrication system as set forth in claim 2 wherein a major portion of said foam particles of said particulate mass thereof are within a range size between approximately 20-mesh and approximately 80-mesh with the remaining foam particles having sizes generally between about 5-mesh and about 200-mesh exclusively of the major portion range size.

5. The lubrication system as set forth in claim 2 wherein said synthetic fibers have an average diameter of generally between about 0.75 and about 5.5 microns.

6. The lubrication system as set forth in claim 2 wherein said synthetic fibers have an average length of generally between about 0.005 and about 0.015 inches.

7. The lubrication system as set forth in claim 2 wherein said synthetic fibers are selected from a group consisting of microfibers of glass and quartz.

8. The lubrication system as set forth in claim 7 wherein said synthetic fibers are microfibers of glass.

9. The lubrication system as set forth in claim 7 wherein said synthetic fibers are microfibers of quartz.

10. The lubrication system as set forth in claim 2 wherein the weight ratio of said foam particles to said synthetic fibers is generally between about 3 to 1 to about 5 to 1.

11. The lubrication system as set forth in claim 2 wherein said mixture contains between about 10 to 20% by weight of said synthetic fibers and foam particles and about 80 to 90% by weight of said liquid lubricant.

12. The lubrication system as set forth in claim 2 wherein said mixture contains between approximately 13 to approximately 17% by weight of said synthetic fibers and foam particles and between approximately 83 to approximately 87% by weight of said liquid lubricant.

13. The lubrication system as set forth in claim 2 wherein said foam particles are selected from a group consisting of ester type polyurethane polymers and ether type polyurethane polymers.

14. The lubrication system as set forth in claim 2 wherein said foam particles have a particulate size in a range generally between about 5-mesh and about 200-mesh.

15. The lubrication system as set forth in claim 2 wherein a major portion of said foam particles have a particulate size smaller than about 20-mesh and larger than about 80-mesh.

16. The lubrication system as set forth in claim 15 wherein said major portion comprises approximately 65 to about 85% of said foam particles.

17. The lubrication system as set forth in claim 2 wherein said foam particles have a particulate size smaller than approximately 8-mesh and larger than approximately 80-mesh.

18. The lubrication system as set forth in claim 2 wherein a plurality of ruptured cell ribs and a plurality of cell walls of the cellular structure of said foam particles define said multi-digited characteristic thereof.

19. The lubrication system as set forth in claim 18 wherein said liquid lubricant is releasably retained generally between at least some of said ruptured cell ribs and cell walls of said foam particles.

20. The lubrication system as set forth in claim 2 wherein said weight ratio of liquid lubricant to said synthetic fibers is in a range of between approximately 24.7 to 1 to approximately 56.7 to 1.

21. The lubrication system as set forth in claim 2 wherein the weight ratio of said liquid lubricant and synthetic fiber mixture to said foam particles is in a range of between about 6.4 to 1 to about 9 to 1.

22. In a lubrication system for an apparatus, the apparatus having a lubricant cavity with a bearing assembly disposed therein adapted to journal a movable component of the apparatus and also having means for feeding a liquid lubricant supplied thereto to the bearing assembly and the movable component for lubricating it with the feeding means being disposed in the cavity in lubricating association with the bearing assembly and the movable component; said lubrication system comprising means adapted to be extruded into said lubricant cavity into interfacing relation with said feeding means for storing said liquid lubricant and releasing it to effect the supply thereof to said feeding means, said storing and releasing means comprising a mixture of said liquid lubricant, a particulate mass of synthetic fibers, and a particulate mass of discrete, non-fibrous, multi-digited, resilient-type polymer foam particles with said liquid lubricant generally saturating said polymer foam particles of said particulate mass thereof and said polymer foam particles having a capacity of releasing at least a major portion of said liquid lubricant stored therein to supply it to said feeding means, a major portion of said polymer foam particles of said particulate mass thereof having a range size generally between about 20-mesh and about 80-mesh with the remaining polymer foam particles of said particulate mass thereof having sizes between about 5-mesh and about 200-mesh exclusively of the major portion range size, and said synthetic fibers of said particulate mass thereof having an average diameter of between about 0.75 microns and about 5.5 microns and an average length of between approximately 0.005 inches and approximately 0.015 inches.

23. In a lubrication system for an apparatus, the apparatus having a lubricant cavity, bearing means disposed in the cavity and in which a rotatable shaft is journaled, wicking means in the cavity for storage of a liquid lubricant, and a fibrous type lubricant feeder wick in interfacing and lubricant transferring relation with both the wicking means and the shaft; the lubrication system comprising a mixture of a particulate mass of discrete, non-fibrous, multi-digited, resilient foam particles and a particulate mass of synthetic microfibers impregnated with said liquid lubricant said mixture comprising said wicking means and having the capacity to transfer said liquid lubricant to said feeder wick at a rate approximating that of said feeder wick for transferring said liquid lubricant to said bearing means.

* * * * *

UNITED STATES PATENT OFFICE
CERTIFICATE OF CORRECTION

Patent No. 4,008,787     Dated February 22, 1977

Inventor(s) James A. Whitt

It is certified that error appears in the above-identified patent and that said Letters Patent are hereby corrected as shown below:

Col. 1, line 40, after "2,966,459" delete "," (comma);
       line 62, delete "Permawick" and insert --"Permawick"--.

Col. 6, line 57, delete "as" (second occurrence) and insert --are--;

Col. 7, line 17, delete "polyurethane" and insert --"polyurethane"--;
       line 20, delete "resilient" and insert --"resilient"--;
       line 21, delete "resilient type" and insert --"resilient type"--; same line, delete "rigid" and insert --"rigid"--;
       line 23, delete "resilient" and insert --"resilient"--;
       line 27, delete "rigid" and insert --"rigid"--;
       line 41, delete "280 oil" and insert --"280 oil"--;
       line 47, after "1" (second occurrence) insert --by--.

Col. 9, line 16, delete "on" and insert --"on"--; same line, delete "off" and insert --"off"--.

Col. 10, line 21, delete "60ppi" and insert --60 ppi--.

Col. 11, line 18, delete "on" (second occurrence) and insert --"on"--;

UNITED STATES PATENT AND TRADEMARK OFFICE
CERTIFICATE OF CORRECTION

PATENT NO. : 4,008,787
DATED : February 22, 1977
INVENTOR(S) : James A. Whitt

It is certified that error appears in the above-identified patent and that said Letters Patent are hereby corrected as shown below:

line 19, delete "off" and insert --"off"--.
Col. 13, line 51, after "of" insert --said--.

Signed and Sealed this

Fourteenth Day of March 1978

[SEAL]

Attest:

RUTH C. MASON
*Attesting Officer*

LUTRELLE F. PARKER
*Acting Commissioner of Patents and Trademarks*